United States Patent [19]
Barney et al.

[11] Patent Number: 5,727,801
[45] Date of Patent: Mar. 17, 1998

[54] TANDEM TRICYCLE

[76] Inventors: Santiago H. Barney; Gael A. Barney, both of 9905 W. Atlantic Blvd., Coral Springs, Fla. 33071

[21] Appl. No.: 511,707
[22] Filed: Aug. 4, 1995
[51] Int. Cl.[6] .................................................. B62K 5/04
[52] U.S. Cl. ......................... 280/231; 280/282; D12/112
[58] Field of Search ............................ 280/230, 231, 280/282; D12/112, 113

[56] References Cited

U.S. PATENT DOCUMENTS

| D. 233,742 | 11/1974 | Boursaw | D12/112 |
| D. 364,835 | 12/1995 | Barney et al. | D12/112 |
| 2,995,378 | 8/1961 | Whetstone | 280/282 |
| 3,075,788 | 1/1963 | Silbereis | 280/231 |
| 3,368,823 | 2/1968 | Templeton | 280/282 X |
| 3,664,684 | 5/1972 | Long | 280/282 X |
| 4,526,392 | 7/1985 | Berkstresser | 280/282 X |
| 4,666,172 | 5/1987 | Hartmann | 280/231 X |
| 5,468,006 | 11/1995 | Delserro | 280/282 X |
| 5,501,478 | 3/1996 | Doan | 280/282 |

FOREIGN PATENT DOCUMENTS

| 44226 | 1/1888 | Germany | 280/231 |
| 1098 | of 1898 | United Kingdom | 280/282 |

*Primary Examiner*—Kevin Hurley
*Attorney, Agent, or Firm*—Malin, Haley, DiMaggio & Crosby, PA

[57] ABSTRACT

A tandem bicycle is disclosed which comprises a frame in part, like that of a tandem bicycle with the rear like that of an adult tricycle particularly adapted to allow two people to propel the vehicle while offering the riders stability so that both occupants experience the physical benefits of propelling the vehicle. Upon an elongated frame, like that of a tandem bicycle, there are two seats, each one mounted behind a pair of handle members, one behind the other. There are also two pairs of pedals in position to be engaged by each rider. In the present invention, the mechanisms associated with the second or rear seat are operable and influence the propulsion and stopping of the vehicle, except for the rear handle members which may not be moved and do not influence steering.

19 Claims, 6 Drawing Sheets

TANDEM TRICYCLE

BACKGROUND OF THE INVENTION

1. Field of the Invention

The present invention relates generally to human propelled vehicles, and more particularly to a front and rear propelled tandem tricycle.

2. Description of the Prior Art

A wide variety of peddle-operated vehicles having from one to four wheels have been developed and marketed. Bicycles (two-wheeled vehicles) are used by both adults and children. Tricycles are commonly used by children before they attain balance and coordination or by adults who want a sturdy ride. Additionally, tandem bicycles have been provided which allow two people to ride the same vehicle. Furthermore, tandem tricycles have also been provided, such as U.S. Pat. No. 3,954,283, issued to Boehm, et al. However, none of the tandem tricycles and bicycles have allowed the rear passenger the ability to propel the vehicle. Thus, the rear passenger is denied the resistance and therefore the health benefits of propelling a vehicle.

Additionally, there have been two or more seater tricycles (U.S. Pat. No. D289,271, issued to Hendrickson and U.S. Pat. No. 4,093,258, issued to Ansel). However, the passengers must sit side-by-side, therefore making the vehicle wider than a traditional tricycle or bicycle. These wider vehicles cannot be ridden on a conventional sidewalk or bike trail and therefore, limit the place of use. If used on a road, the wider vehicle takes up a great deal of space, sometimes becoming a traffic hazard.

Moreover, the latter-mentioned tricycles are lower to the ground than tandem bicycles and therefore do not permit the riders to see above a conventional automobile, thus obstructing the riders' visibility. Furthermore, vehicles built for two or more riders can become unstable under adverse road or weight conditions when two or more vehicle frames are connected together or when devices (seats, wheels, etc.) are connected to pre-existing vehicles (such as U.S. Pat. No. 4,290,620, issued to Chika and U.S. Pat. No. 3,902,738, issued Gandrud).

Although tandem bicycles allow two passengers to propel the bicycle and therefore benefit from the physical activity, there remains the problem of balance and coordination that is required when operating a tandem. Adults who would enjoy riding together on a tandem bicycle but do not like the instability would enjoy a vehicle that could offer the joy of a tandem with the stability of a tricycle. It is therefore, to the effective resolution of the aforementioned problems and shortcomings of the prior art that the present invention is directed.

SUMMARY OF THE INVENTION

The present invention comprises a frame in part, like that of a tandem bicycle with the rear like that of an adult tricycle particularly adapted to allow two people to propel the vehicle while offering the riders stability so that both occupants experience the physical benefits of propelling the vehicle. Upon an elongated frame, like that of a tandem bicycle, there are two seats, each one mounted behind a pair of handle members, one behind the other. There are also two pairs of pedals in position to be engaged by each rider. In the present invention, the mechanisms associated with the second or rear seat are operable and influence the propulsion and stopping of the vehicle, except for the rear handle members which may not be moved and do not influence steering.

The present invention provides an improvement in tricycles and tandems, wherein one or both adults who have difficulty in balancing on a tandem may yet ride together on a single vehicle, without having to balance (as with riding conventional tandem bicycles) and therefore experience the stability of a tricycle with the convenience of a tandem.

It is an object of this invention to provide a dual passenger pedal vehicle having two drive pedal assemblies for dual passenger propulsion and a single steering system for front passenger steering.

It is another object of the present invention to provide a dual passenger pedal vehicle having a second set of handle bars which extend upwardly of, and are affixed to, the vehicle for stabilizing the rear passenger.

It is yet another object of the present invention to provide a dual passenger pedal vehicle wherein the rear drive assembly is detachably interconnected for disassembly of a first and a second portion of the frame for improved storage and transportation.

It is still another object of the present invention to provide a dual passenger pedal vehicle wherein the rear axles are negatively cambered so that the two rear wheels are at an angle in order to make the vehicle more stable.

It is even still another object of the present invention to provide a dual passenger pedal vehicle with a pivoting mechanism that allows the front fork to handle like a bicycle.

It is a further object of the present invention to provide a dual passenger pedal vehicle with rear brakes that allow for quicker stopping even with the added load of a rear occupant.

It is an even further object of the present invention to provide a dual passenger pedal vehicle which is economical to manufacture, efficient in use, capable of a long operating life, and particularly well adapted for the proposed use.

It is a still further object of the present invention to provide a dual passenger pedal vehicle whereby two people can ride without any need to balance the vehicle while driving or stopping and wherein the vehicle includes easily attachable and removable or interchangeable accessories enabling the rider to take along a child or various cargos.

Other objects and advantages of this invention will become apparent from the following description taken in conjunction with the accompanying drawing, wherein are set forth, by way of illustration and example, certain embodiments of this invention.

BRIEF DESCRIPTION OF THE DRAWINGS

The invention may be better understood by reference to the drawings in which.

DESCRIPTION OF THE PREFERRED EMBODIMENTS

As required, detailed embodiments of the present invention are disclosed herein, however, it is to be understood that it is not intended to limit the invention to the exact terms of description or details of illustration, for it will be apparent to those skilled in the art that modifications and variations are possible within the spirit and scope of the invention.

Figure 6:
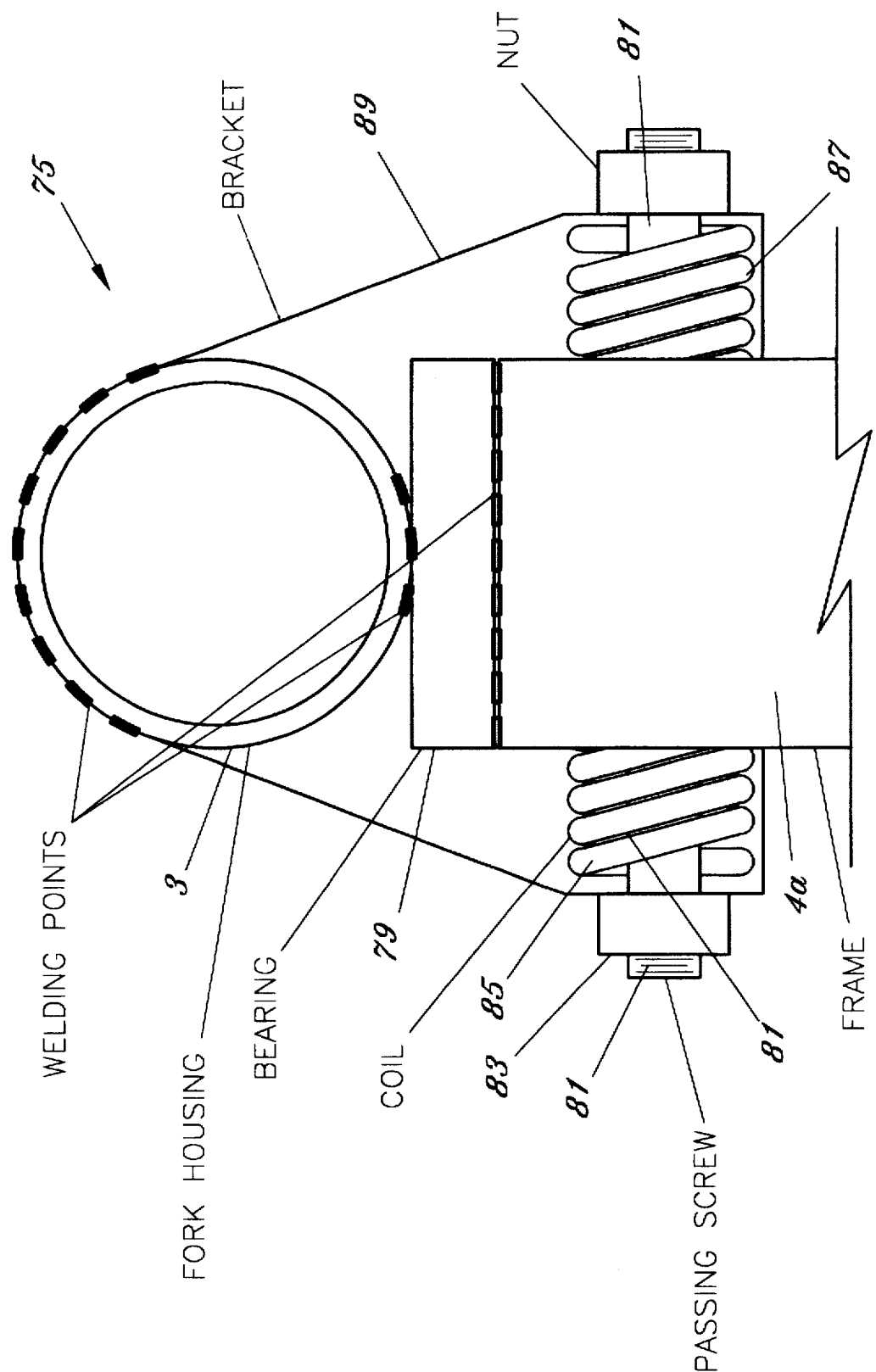
FIG. 6 is top sectional view of the front fork assembly pivoting mechanism for a tandem tricycle in accordance with the present invention.

As seen in the drawings, the present invention incorporates elements of a tandem bicycle, including a front wheel 1 mounted on a conventional fork assembly 2 (or a fork assembly with an optional pivoting mechanism 75, FIG. 6, discussed below) journalized in a mounting sleeve 3 at the front of frame 3a with a stem 4 and supporting handle member 17. Handle member 17 engages the fork at the top thereof to turn fork assembly 2 or 75, in order to steer the vehicle. Handle member 17 may be provided with conventional grip members (not shown) on either or both ends of handle member 17. Front wheel 1 is conventionally attached to fork assembly 2, via conventional wheel rim 33 which has a plurality of conventional spokes 33a or via a polyurethane wheel (not shown) and its associated polyurethane spokes (also not shown). Similarly, back wheels 10 and 11, are conventionally attached to their respective axle assemblies, via conventional wheel rims 40 also having a plurality of conventional spokes 40b or via a polyurethane wheel and its associated polyurethane spokes.

Conventional pedals 21 and 22 are mounted on crank 19 and conventional pedals 23 and 24 are mounted on crank 20. Cranks 19 and 20 are connected to and are operatively associated with chainrings 8 and 9, respectively. Furthermore, each chainring is connected to a propulsion mechanism such as chain 30. Moreover, there is a second chain system is provided whereby rear crank set 20 is operatively associated with and connected to a freewheel 46 mounted to an axle 49 via a portion of chain 30. Axle 49 engages the rear geared wheel 11 so that the vehicle may be driven by the pedaling from the rear passenger associated with crank set 20 and/or by the front passenger associated with crank set 19.

A belt propulsion mechanism could also be used instead of the chain mechanism. In such embodiment, the chain rings, tensioners and the freewheel are replaced with another set of components suited for belt dimensions and usage.

Rear wheels 10 and 11 are rotatably mounted upon a set of two horizontally opposed axles 50 and 49, respectively. A conventional seat 15 is mounted behind front wheel 1, so that a front operator may sit upon seat 15 and propel the vehicle by operating the pedals 21 and 22, steering the vehicle by handle member 17, and stopping the vehicle by pulling or otherwise operating a conventional front brake 34. Front brake 34, preferably, is associated with front wheel 1. However, such is not limiting, and front brake 34 may be associated, with one or both back wheels 10 and/or 11, for stopping the vehicle, when such is so desired.

A second conventional rear seat 16 is mounted on the frame behind a second handle member 18, so that a second operator may sit upon this seat and propel the vehicle by operating the second set of pedals 23 and 24 and stop the vehicle with a second set of conventional rear brakes 35 and 36. Rear brakes 35 and 36, preferably, is associated with back wheels 10 and/or 11. However, such is not limiting, and rear brakes 35 and 36 may be associated, with front wheel 1, for stopping the vehicle.

Rear passenger's seat tube 14 is mounted on top of the bottom horizontal tube or beam 7, that goes between both bottom bracket housings 31 and 32, to elevate a rear passenger or operator sitting upon seat 16, with the intent of improving the rear passenger's visibility over the front driver. Thus, in use seat 16 is disposed relatively higher in vertical height as compared to seat 15 for improving the rear passenger's visibility. However, the vehicle may be provided with conventional seat height adjustment means (not shown), for either one or both of the seat members.

For storage and transportation purposes, the vehicle is detachable, to define a front frame portion and a rear frame portion, at the bottom tube extension by a telescopic connection tube 26 located behind the rear bottom bracket and by a second telescopic connection tube 60. Connection tubes 26 and 60 are preferably connected horizontally between the rear passenger seat tube 14 and the support tubes coming from axles 12. Connection tubes 26 and 60 may be conventionally connected to each other. In a preferred embodiment, connection tube 26 is provided with one or more apertures 26a, while connection tube is also provided with one or more apertures 60a.

When connecting tubes 26 and 60 to each other, at least one of apertures 26a is aligned with at least one of apertures 60a, by inserting tube 60 within tube 26. A bolt or other conventional means, is inserted through such apertures to securely attach the front frame portion to the rear frame portion, via connection tubes 26 and 60. To detach, the bolt is removed from apertures 26a and 60a, to allow tube 60 to be removed from within tube 26. The insertion of tube 60 within tube 26, and subsequent removable connection, to properly align apertures 26a and 60a, also provides for the proper insertion and retention of stub 70 within tube 28 depending from seat post 14. For added safety in the retention of stub 70 within tube 28, stub 70 and tube 28 may also be provided with apertures and removable connection means (both not shown) similar to telescoping tubes 26 and 60. Alternatively, tubes 26 and 60 may be designed such that, when attaching, tube 26 is inserted within tube 60. Likewise, tube 28 may be attached to rear frame portion 40a and stub member 70 attached to seat post 14.

Thus, the present invention allows the dual passenger vehicle to be disassembled into two separate parts for ease of transportation. This disassembly could be accomplished by telescopic unions. The first union may be located in the bottom tube which goes between the rear bottom bracket housing and the axle unit housing. The second and third telescopic unions may be located in the same part in each of the two support tubes which go between the rear seat tube and the rear axle housings.

An elongated frame 3a, for example, can comprise a first front frame portion 4a, which includes tubes or beams, 5, 6, 7 and 7a extending rearwardly from the fork tube housing 3, and a second rear frame portion 40a, which includes axles 49 and 50, axle housings 47 and 48 and tubes or beams 41 and 42, extending rearwardly from front frame portion 4a. As described above, front frame portion 4a and second frame portion 40a may be detachable from each other. Furthermore, other tube and beam combinations for the frame member are within the scope of the invention.

A conventional seat 15 is conventionally mounted upon front frame portion 4a by a driver's seat post 13a and seat tube 13 that is, preferably, welded in the middle point of front frame portion 4a and a second similar seat member 16 is similarly mounted near the rear end of front frame portion 4a. An optional conventional basket, cooler, etc. may also be conventionally mounted to handle member 17 that is attached to front frame portion 4a, or to a bar (not shown) that can be welded to the second rear frame portion 40a.

Second seat 16 is preferably mounted upon front frame portion 4a by a seat post 14a and seat tube 14, which is place on top of the bottom bracket housing 31 so that seat 16 and seat tube 14 are slightly higher than the first passenger seat tube 13. Conventional tightening bolts (not shown) may also be provided so that the first and second seats may be vertically adjusted to accommodate the operators, particularly in view that different sized adults may be seated on the seats.

A first pair of handle members 17 are mounted upon and extending upwardly from the fork assembly 2 and fork sleeve 3 ahead of first seat 15 to allow a front operator sitting on seat 15 to steer the vehicle. A second set of handle members 18 are preferably mounted for vertical adjustment journalized in the same tube or post 13 as the first seat 15 secured to first frame portion 4a. Unlike handle member 17, handle member 18 has no steering capabilities. On each set of handle members, there are mounted brake handles 34 (front operator or passenger), 35, and 36 (back operator or passenger). Furthermore, handle members 17 and/or handle members 18 may be provided with conventional grip members (not shown) on either or both ends of handle members 17 and/or 18.

An optional rear brake may consist of a piece of horizontally positioned tubing 43 mounted on and welded to the two angled support tubes 41 and 42 which go between the rear seat tube 14 and the two independent axle housings 47 and 48. Horizontal tube 43 may support at each end a conventional bicycle brake assembly (not shown) which could be positioned on top of each rear wheel 10 and 11. This brake can be conventionally operated independently or simultaneously by the rear occupant or could be set up to be operated by the front driver.

A second set of pedal means for the operator or passenger seating in rear seat 16 is also provided to allow the rear passenger to pedal, thus, propelling the vehicle. The pedal means include pedals 23 and 24, wherein each is respectively mounted to the left and right side of a crank 20 and extending laterally outward therefrom. Each set of pedal cranks 19 and 20 are rotatably mounted within crank housings 31 and 32, respectively, and include a conventional mechanism thereon for transmitting rotational motion to the respective ground engaging rear wheel 10 or 11.

A front wheel pivoting mechanism fork assembly 75 (FIG. 6) that gives the vehicle extra "handling," similar to a bicycle, when traveling at high speeds or on uneven terrain can be provided. Pivoting mechanism 75 which allows the fork sleeve to swivel to the left and/or right to provide added stability when turning. The pivoting mechanism provides a limited right or left downward swiveling movement when pressure is applied to handle bar 17. This swiveling movement in combination with regular steering will provide added stability when maneuvering through uneven terrain.

Pivoting mechanism 75, preferably, is located at the front portion of the frame 3a in place of the conventional fork assembly. When incorporating the pivot mechanism within frame 3a, conventional fork housing tube 3 is replaced by a vertical connecting tube or end tube 76, added to the front of the frame 3a. A bearing 79 is welded between tube 76 and fork tube housing 3 in a vertical manner. Horizontally opposed coils 85 and 87 are disposed at opposite sides of end tube 76 and are connected by a passing screw or bolt 81, or other conventional connecting means, that is supported by a bracket 89 welded to fork tube housing 3.

Thus, the pressing on handle bar member 17 to either the right or left, causes the opposite side coil to give in, which allows the fork housing 3 to move. Thus coils 85 and 87 compensate to provide added stability when riding and/or steering on uneven terrains. Passing screw 81 guides coils 85 and 87, as well as holding the coils in place. However, screw 81 does not interfere with the compensation being provided by coils 85 and 87.

Figure 1:
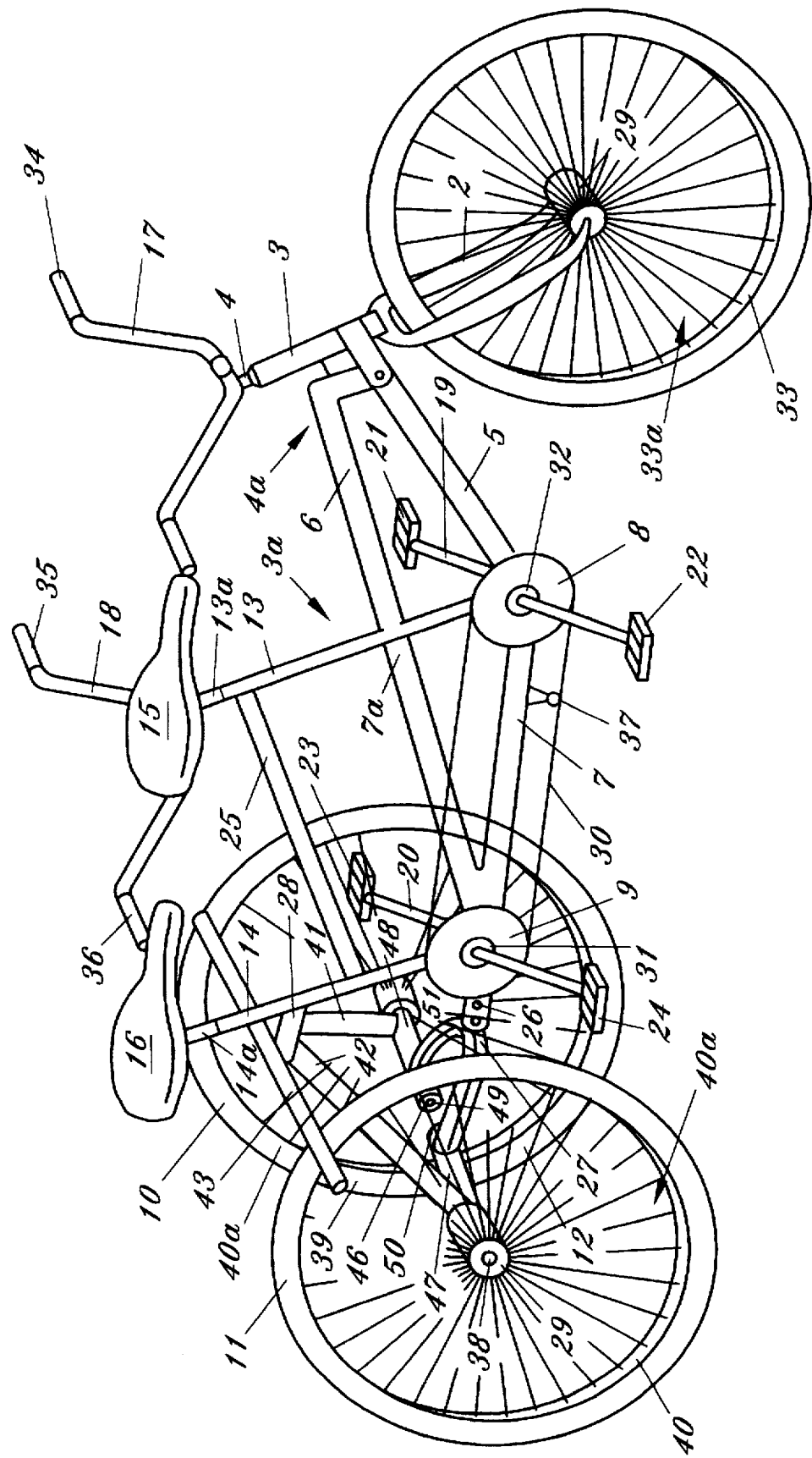
FIG. 1 is a isometric view of a tandem tricycle in accordance with the present invention.
Figure 2:
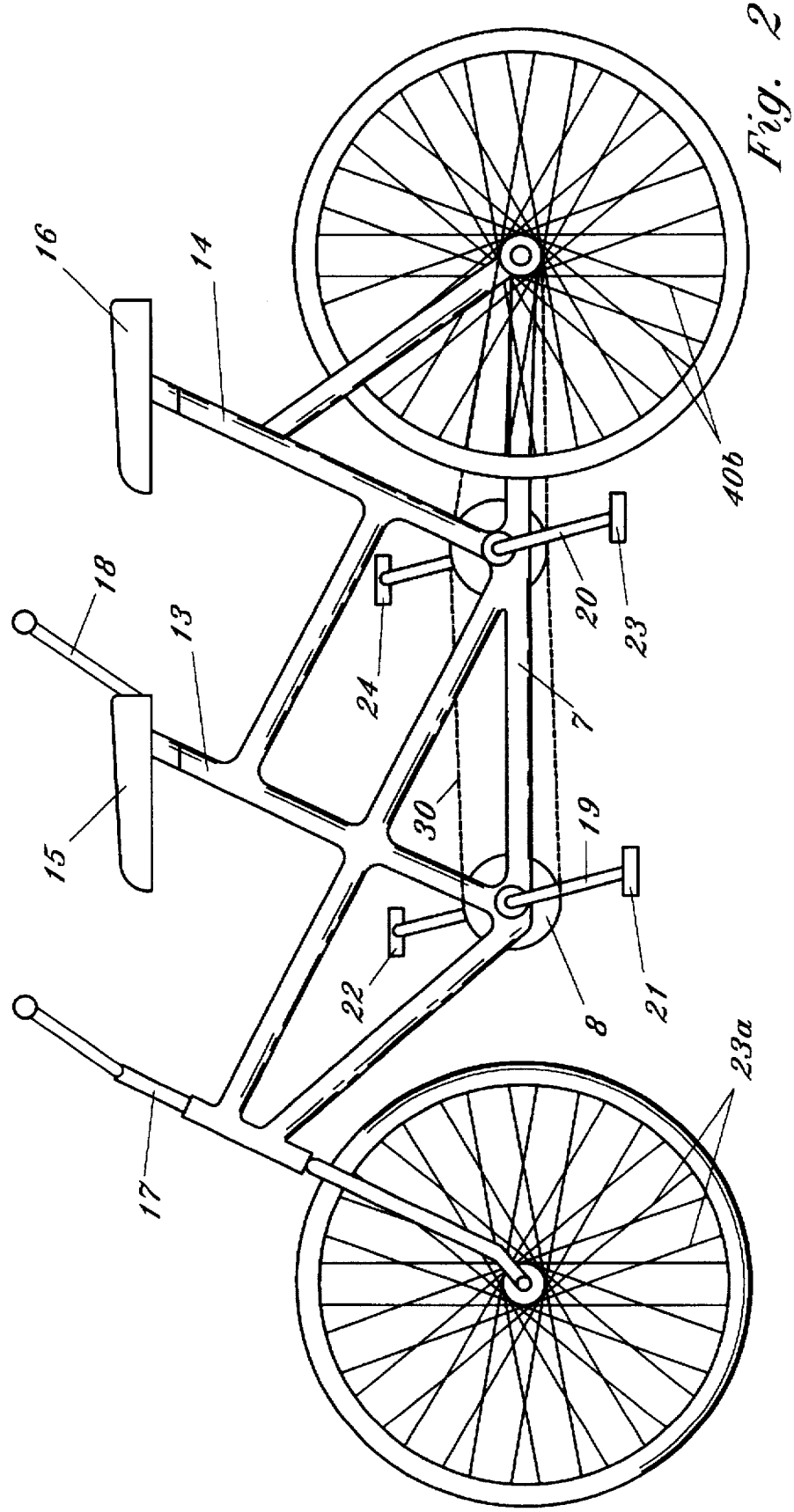
FIG. 2 is a side elevational view of a tandem tricycle in accordance with the present invention.
Figure 3:
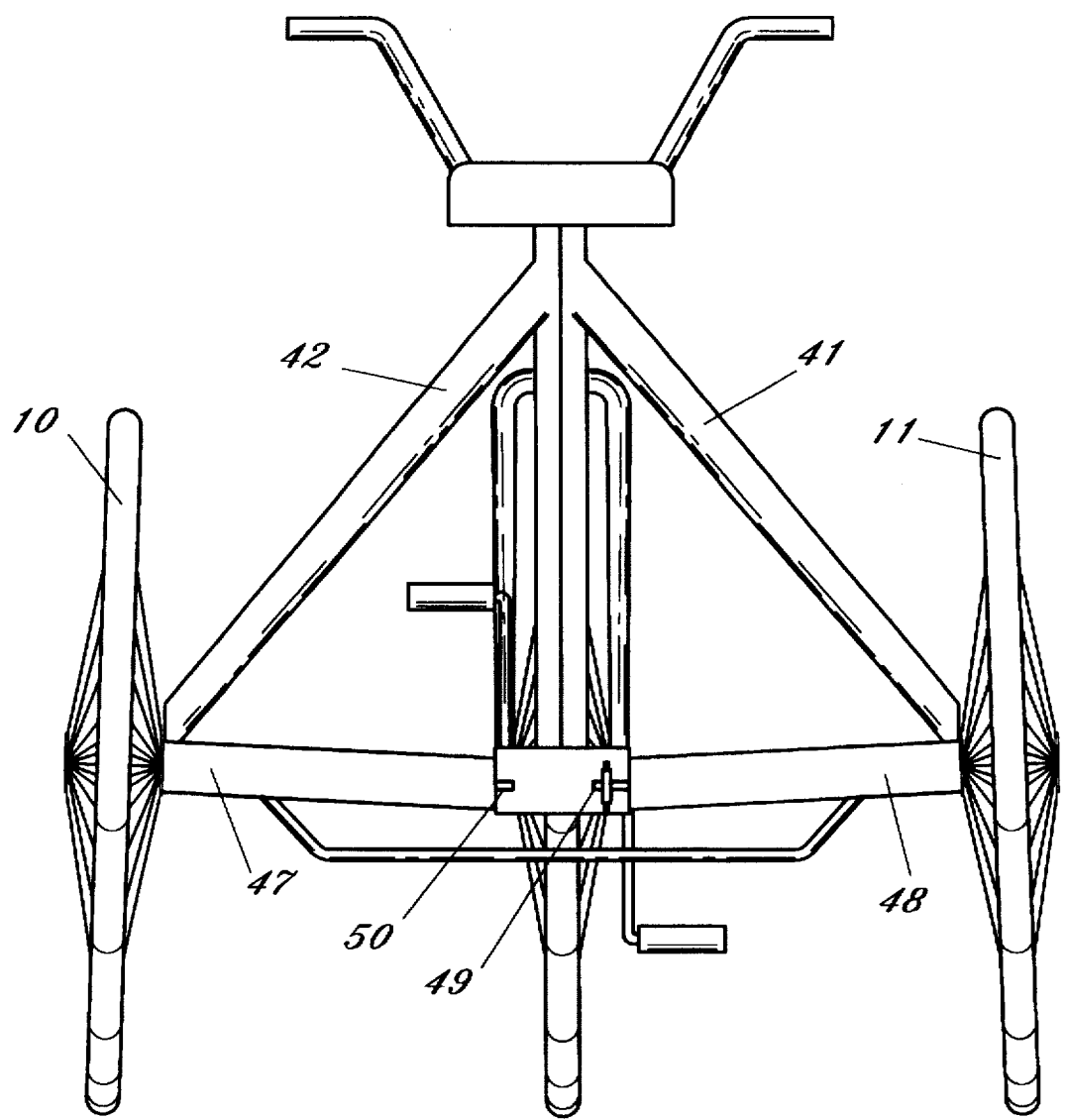
FIG. 3 is a rear elevational view of a tandem tricycle in accordance with the present invention.
Figure 4:
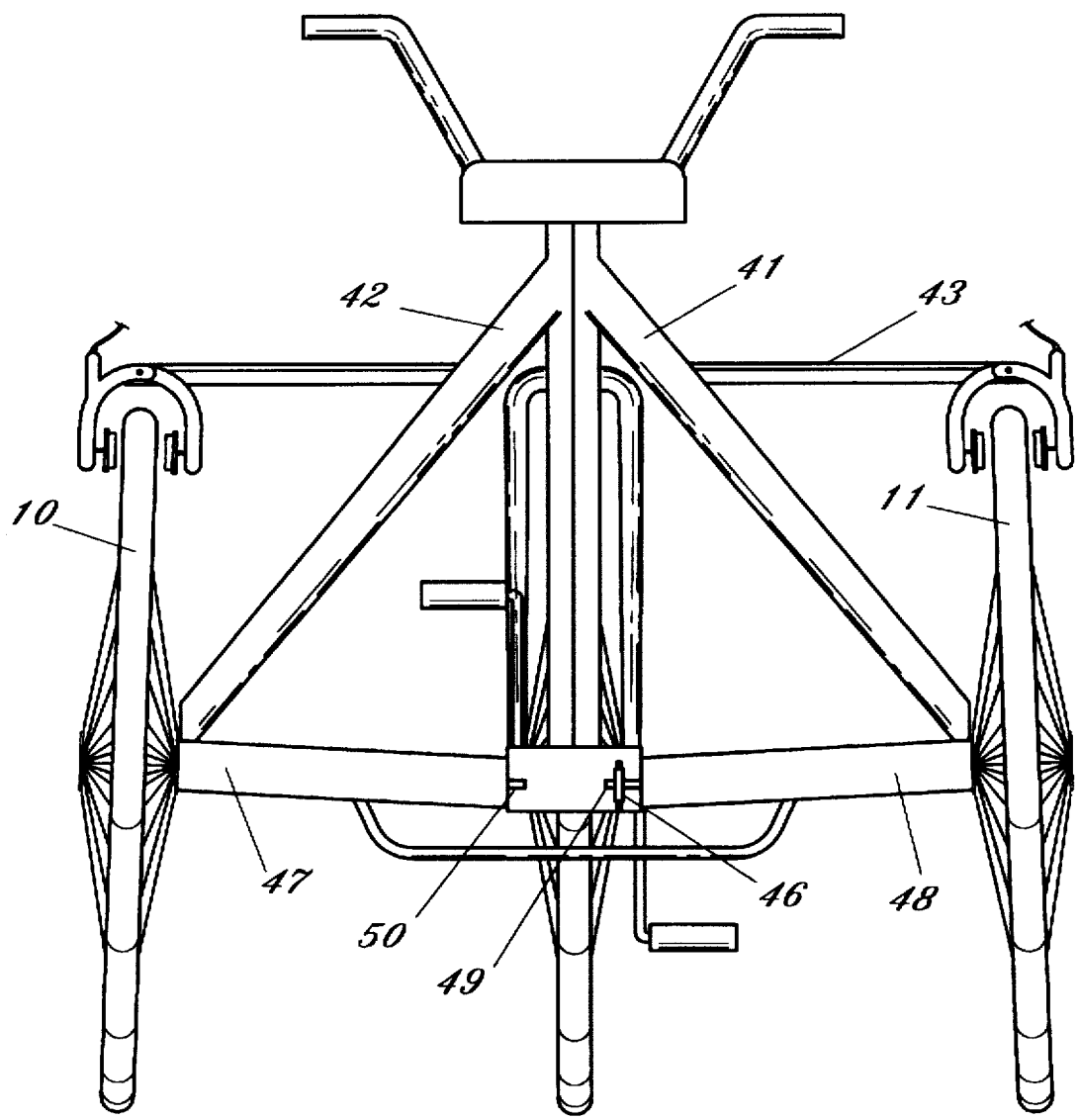
FIG. 4 is a rear elevational view of a tandem tricycle in accordance with the present invention.
Figure 5:
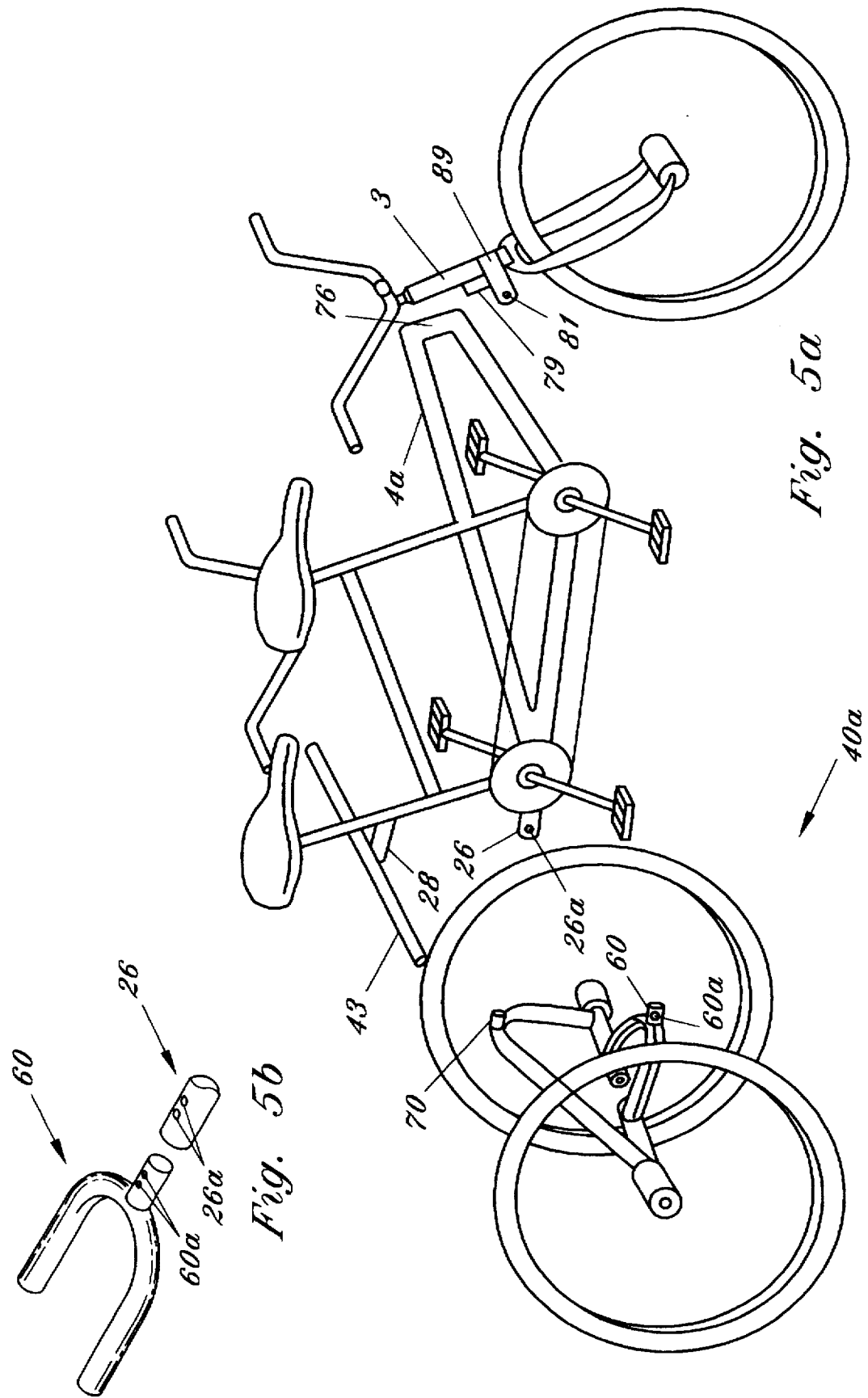
FIG. 5a is an exploded isometric view of a tandem tricycle in accordance with the present invention.
FIG. 5b is a cutaway view of the telescoping union of the frame portions of a tandem tricycle in accordance with the present invention.

FIG. 3 illustrates the negatively cambered rear axles 49 and 50. Preferably, axles 49 and 50 are cambered at an angle of 3° to 5° to increase the stability of the vehicle. However, these degree figures are not limiting, and other figures may be utilized for the camber angle of axles 49 and 50 and are within the scope of the present invention. Furthermore, rear axles 49 and 50 do not have to be cambered for operation of the vehicle, and are only provided to increase the stability of the vehicle.

Additionally, one or more small sprockets 37 may be provided along frame 3a, adjacent chain 30, to provide additional tension on chain 30, as desired. Furthermore, the present invention also can be set up to have the rear and front riders propel the vehicle independently from each other. This is done by having two separate sets of chains engaging the chain rings and also two propelling gears (freewheel) mounted on each of the axles. Furthermore, various conventional auxiliary equipment (not shown), such as fenders and the like may be provided in connection with the vehicle, although such is not limiting.

The three-wheeled vehicle described above is quite steady and stable so that two adults can ride such a vehicle without the necessity of coordinating their balance, as is required upon conventional tandem bicycles.

As stated above, the front frame portion of the vehicle can be composed of a conventional fork sleeve that accommodates a fork assembly that supports the front wheel. The front frame portion can be composed of any combination of horizontal and angled tubings or beams which will support a front passenger's seat tube and a bottom bracket sleeve, and a rear passenger's seat tube and bottom bracket sleeve. The rear frame portion of the vehicle is composed of any combination of angled tubings or beams with the purpose of supporting the two cambered rear axle housings.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tandem tricycle allowing a front passenger and/or a back passenger to pedal to propel said tricycle, comprising:

a frame member having a front portion and a rear portion;

means for removably attaching said front portion to said rear portion;

a front wheel member operatively associated with the first end of said front portion;

a first handle member operatively associated with said front wheel member;

a fork housing pivoting mechanism operatively associated with said front wheel member and said first handle member;

a second handle member attached to said front portion intermediate said first end and said second end of said front portion;

a front seat member attached to said frame member;

a rear seat member attached to said frame member and disposed behind said front seat member, said rear seat member disposed vertically higher than said front seat member to provide visibility to the rear passenger over the front passenger;

first and second rear wheel members operatively associated with said frame member, said first and second rear wheel members each having a negatively cambered rear axle member;

a front wheel brake system disposed on said first handle member and operatively associated with said front wheel member;

a rear wheel brake system disposed on said second handle member and operatively associated with said rear wheel members;

a first pedals and crank system attached to said frame member adjacent said first seat member;

a second pedals and crank system attached to said frame member adjacent said second seat member; and a gear and chain system attached to said frame member and operatively associated with said first pedals and crank system and said second pedals and crank system to allow either or both said front passenger or said back passenger to pedal to propel said tricycle;

wherein said means for removably attaching said front portion to said rear portion is a first lower telescoping bottom tube member and an upper tube extension member attached to said front portion of said frame member and a second lower telescoping bottom tube member and a upper stub member attached to said rear portion of said frame member, wherein when said rear portion is removably attached to said front portion, at least a portion of said second lower telescoping member is inserted and secured within said first lower telescoping tube member and said upper stub member is inserted within said upper tube extension member.

2. The tandem tricycle of claim 1, wherein said rear axle members are negatively cambered between 3° to 5°.

3. The tandem tricycle of claim 1, further including at least one relatively small sprocket attached to said frame member in addition to said first and second pedals and crank systems, said sprocket operatively associated with said gear and chain system, said sprocket providing tension to a chain member of said gear and chain system.

4. A tandem tricycle allowing a front passenger and/or a back passenger to pedal to propel said tricycle, comprising:

a frame member having a front portion and a rear portion;

means for removably attaching said front portion to said rear portion;

a front wheel member operatively associated with the first end of said front portion;

a first handle member operatively associated with said front wheel member;

a fork housing pivoting mechanism operatively associated with said front wheel member and said first handle member;

a second handle member attached to said front portion intermediate said first end and said second end of said front portion;

a front seat member attached to said frame member;

a rear seat member attached to said frame member and disposed behind said front seat member, said rear seat member disposed vertically higher than said front seat member to provide visibility to the rear passenger over the front passenger;

first and second rear wheel members operatively associated with said frame member, said first and second rear wheel members each having a negatively cambered rear axle member;

a front wheel brake system disposed on said first handle member and operatively associated with said front wheel member;

a rear wheel brake system disposed on said second handle member and operatively associated with said rear wheel members;

a first pedals and crank system attached to said frame member adjacent said first seat member;

a second pedals and crank system attached to said frame member adjacent said second seat member; and a gear and chain system attached to said frame member and operatively associated with said first pedals and crank system and said second pedals and crank system to allow either or both said front passenger or said back passenger to pedal to propel said tricycle;

wherein said fork housing pivoting mechanism comprises:

a bearing member attached at one end to a first end of said front portion of said frame member and at an opposite end to a fork housing;

horizontally opposed first and second coils disposed at opposite sides of the first end of said front portion;

an elongated screw or bolt member disposed through said coils and the first end of said front portion; and a bracket member disposed around said fork housing and attached at one end to a first end of said screw or bolt member and attached at an opposite end to a second end of said screw or bolt member.

5. The tandem tricycle of claim 4, wherein said rear axle members are negatively cambered between 3° to 5° to improve stability of said tandem tricycle.

6. The tandem tricycle of claim 4, further including at least one relatively small sprocket attached to said frame member in addition to said first and second pedals and crank systems, said sprocket operatively associated with said gear and chain system, said sprocket providing tension to a chain member of said gear and chain system.

7. A tandem tricycle allowing a front passenger and/or a back passenger to pedal to propel said tricycle, comprising:

a frame member having a front portion and a rear portion;

means for removably attaching said front portion to said rear portion;

a front wheel member operatively associated with the first end of said front portion;

a first handle member operatively associated with said front wheel member;

a second handle member attached to said front portion intermediate said first end and said second end of said front portion;

a front seat member attached to said frame member;

a rear seat member attached to said frame member and disposed behind said front seat member;

first and second rear wheel members operatively associated with said frame member;

a first pedals and crank system attached to said frame member adjacent said first seat member;

a second pedals and crank system attached to said frame member adjacent said second seat member; and a gear and chain system attached to said frame member and operatively associated with said first pedals and crank system and said second pedals and crank system to allow either or both said front passenger or said back passenger to pedal to propel said tricycle;

wherein said means for removably attaching said front portion to said rear portion is a first lower telescoping bottom tube member and an upper tube extension member attached to said front portion of said frame member and a second lower telescoping bottom tube member and a upper stub member attached to said rear portion of said frame member, wherein when said rear portion is removably attached to said front portion, at least a portion of said second lower telescoping member is inserted and secured within said first lower telescoping tube member and said upper stub member is inserted within said upper tube extension member.

8. The tandem tricycle of claim 7 further including a front wheel brake system disposed on said first handle member and operatively associated with said front wheel member.

9. The tandem tricycle of claim 7 further including a rear wheel brake system disposed on said second handle member and operatively associated with said rear wheel members.

10. The tandem tricycle of claim 7 wherein said rear seat member can be disposed vertically higher than said front seat member to provide visibility to the rear passenger over the front passenger.

11. The tandem tricycle of claim 7 further including a fork housing pivoting mechanism operatively associated with said front wheel member and said first handle member.

12. The tandem tricycle of claim 7 wherein said first and second rear wheel members each having a negatively cambered rear axle member.

13. A tandem tricycle allowing a front passenger and/or a back passenger to pedal to propel said tricycle, comprising:
- a frame member having a front end and a rear end;
- a front wheel member operatively associated with the front end of said frame member;
- a first handle member operatively associated with said front wheel member;
- a fork housing pivoting mechanism operatively associated with said front wheel member and said first handle member;
- a second handle member attached to said frame member intermediate a first end and a second end of said front end;
- a front seat member attached to said frame member;
- a rear seat member attached to said frame member and disposed behind said front seat member;
- first and second rear wheel members operatively associated with said frame member;
- a first pedals and crank system attached to said frame member adjacent said first seat member;
- a second pedals and crank system attached to said frame member adjacent said second seat member; and
- a gear and chain system attached to said frame member and operatively associated with said first pedals and crank system and said second pedals and crank system to allow either or both said front passenger or said back passenger to pedal to propel said tricycle;

wherein said fork housing pivoting mechanism comprises:
- a bearing member attached at one end to a first end of said front end of said frame member and at an opposite end to a fork housing;
- horizontally opposed first and second coils disposed at opposite sides of the first end of said front end;
- an elongated screw or bolt member disposed through said coils and the first end of said front end; and
- a bracket member disposed around said fork housing and attached at one end to a first end of said screw or bolt member and attached at an opposite end to a second end of said screw or bolt member.

14. The tandem tricycle of claim 13 further including means for removably attaching said front end to said rear end.

15. The tandem tricycle of claim 13 wherein said rear seat member disposed vertically higher than said front seat member to provide visibility to the rear passenger over the front passenger.

16. The tandem tricycle of claim 13 wherein said first and second rear wheel members each having a negatively cambered rear axle member.

17. The tandem tricycle of claim 13 further including a front wheel brake system disposed on said first handle member and operatively associated with said front wheel member.

18. The tandem tricycle of claim 13 further including a rear wheel brake system disposed on said second handle member and operatively associated with said rear wheel members.

19. The tandem tricycle of claim 14 wherein said means for removably attaching said front end to said rear end is a first lower telescoping bottom tube member and an upper tube extension member attached to said front end of said frame member and a second lower telescoping bottom tube member and a upper stub member attached to said rear end of said frame member, wherein when said rear end is removably attached to said front end, at least a portion of said second lower telescoping member is inserted and secured within said first lower telescoping tube member and said upper stub member is inserted within said upper tube extension member.

* * * * *